Oct. 22, 1935. W. A. BOUGHTON ET AL 2,017,943
METHOD OF MAKING MICA PRODUCTS
Filed June 20, 1934
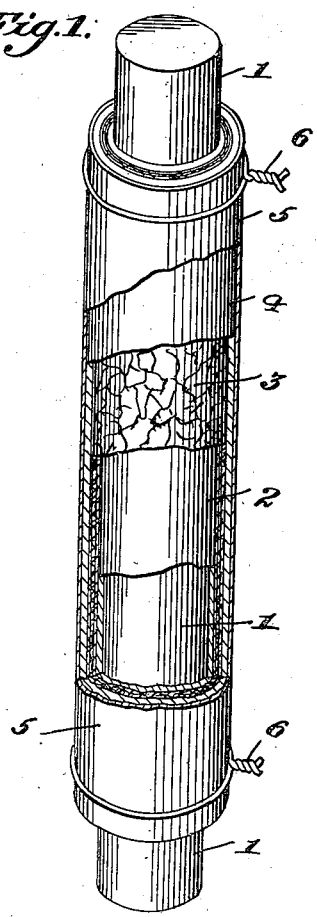
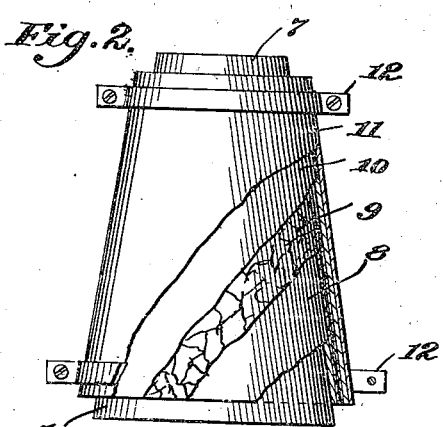
Inventors:
Willis A. Boughton
and William R. Mansfield,
Atty.

Patented Oct. 22, 1935

2,017,943

UNITED STATES PATENT OFFICE 2,017,943

METHOD OF MAKING MICA PRODUCTS

Willis A. Boughton, Cambridge, and William R. Mansfield, Boston, Mass., assignors to New England Mica Co., Waltham, Mass., a corporation of Massachusetts Application June 20, 1934, Serial No. 731,560

11 Claims. (Cl. 154—2.6)

This invention relates to methods of making molded and shaped laminated mica products.

This invention is a further development of the inventions disclosed in our application on Method of making molded laminated mica products with inorganic binders, filed March 18, 1932, Serial Number 599,844, Patent No. 1,975,080 dated October 2, 1934.

One object of the invention is to provide a method for the production of molded and shaped laminated products, which will withstand high temperatures without delamination, and which will retain their high electrical resistance over a wide range of temperatures, and which may be used for a great variety of purposes.

The nature and scope of the invention will be understood from a description of the preferred methods of manufacture with reference to the accompanying drawing, in which:

Figure 1 illustrates diagrammatically the method when applied to the manufacture of laminated mica tubes; and Fig. 2, the method applied to making mica cones.

As shown in Fig. 1, a suitable metal core such as a steel rod 1 is covered with a layer of carbonizable material such as kraft paper 2 or similar paper. The paper layer, when the core is of sufficient diameter, may be next covered with a multiplicity of mica flakes cemented to each other with an inorganic adhesive, or it may be enwrapped with a layer or layers 3 of composite mica consisting of a preformed sheet composed of mica flakes cemented together with an aqueous inorganic adhesive described hereinafter. Over the surface of the mica layer is next wound a layer of carbonizable material 4 such as kraft paper, and upon the kraft paper is wound an outer metallic layer 5, for example copper foil. Clamps or tie wires 6 are placed around the ends to secure the several layers in place on the core. The assembly is baked at a suitable elevated temperature to eliminate the excess of water from the adhesive and harden the same. During the heating the kraft paper or other coating against the mica sheet is reduced to a friable carbon. After cooling the wrappings and core are removed from the stiff and integrated laminated mica tube and the finishing operations to prepare it for use are performed.

As shown in Fig. 2, illustrating the production of a cone, the method used is the same. Upon a conical metal core or support 7 there is secured a destructible layer 8 preferably kraft paper and this destructible layer may be covered with mica flakes 9 cemented to each other by the necessary amount of colloidal inorganic adhesive until a layer of sufficient thickness is built-up, or a sheet or sheets of integrated mica flakes, as described, may be applied to the paper on the core. Surrounding the mica 9 is a second layer 10 of destructible material, preferably kraft paper, and this last layer may be covered by a layer of metal foil 11, as before, the whole being suitably secured by end clamps 12. Instead of the outer layer of foil, a split metal cone may be pressed over the second paper layer 10 and secured by clamps.

The adhesive used consists of an aqueous colloidal association of such inorganic compounds as form highly viscous adhesive colloidal bodies which upon heating lose water and become more viscous and on cooling become stiff fluids to solids possessing the property of being reversibly thermoplastic. Upon still higher heating these compounds lose more water and become glass-like bodies also having the property of being reversibly thermoplastic upon cooling. These compounds possess the remarkable property of adhering to mica surfaces and to effectively cement a multiplicity of mica flakes into integrated bodies. Among the inorganic compounds possessing these properties are alkali metal metaphosphates, such as sodium and potassium metaphosphates, alkali metal monoborates, such as sodium and potassium monoborates, and beryllium sulphate. Mixtures of solutions of the phosphate and borate compounds also produce colloidal associations which are adhesive and possess the property of being reversibly thermoplastic and may be used in this process.

To these aqueous solutions may be added, when desired, crystallization restraining substances such as solutions of sodium arsenite, sodium dichromate, potassium carbonate, and others described in the application of Willis A. Boughton, Serial Number 546,154, filed June 22, 1931, Patent No. 2,016,274, dated October 8, 1935, on Method of restraining crystallization.

The properties of these colloidal associations are described in the Dawes and Boughton United States Patents 1,578,812, and 1,578,813, dated March 30, 1926; also in the Willis A. Boughton U. S. Patents Nos. 1,975,077 and 1,975,079 dated October 2nd, 1934, and others, in connection with laminated mica products.

In the preparation of tubes, for example, a preferred procedure is as follows. We prepare an adhesive consisting of a concentrated aqueous solution of glassy sodium metaphosphate and dilute it with water to 25–40 percent concentration by weight, the higher concentrations yielding greater viscosities of the solutions and the lower concentrations greater freedom from oozing at higher temperatures. A laminated mica sheet of suitable size and thickness may be prepared with mica flakes in any usual manner with the above described inorganic adhesive as a binder. The solvent is then partly removed from this highly flexible sheet by quickly heating and rolling on a hot table, during which operation protection of the surface as by covering with sheets of canvas or other suitable material is desirable. The sheet thus dried but still somewhat flexible may be used as such (condition 1) to prepare the tube, or it may be further heated up to approximately 200° C.–300° C., (392° F.–572° F.), and substantially dehydrated under pressure as in a press (condition 2). In either instance, after heating and dehydration have been carried to the desired point, the plate is cooled and trimmed to a size slightly larger than that finally required. After warming to flexibility at a temperature of approximately 110–120° C. or 230–248° F. (when in condition 1), and roughly 300° C. or 572° F., approximately the temperature used for prior heating (when in condition 2), the exact temperatures being subject to choice and depending only on the temperature of prior heating, the highly flexible sheet is then wrapped around a paper covered metal or other rod or dowel or form, by hand or in a machine. Adhesion between the convolutions may be enhanced by application of an additional coat of binder to the sheet, with or without further drying. After the mica sheet has been applied, it is enwrapped with an outer layer of paper, a metal foil layer is wound upon the paper, and the whole is suitably clamped on the core.

The tube, now cold and inflexible but capable of again becoming somewhat moldable upon moderate application of heat, is baked at a temperature of about 540° C.–620° C. (1004–1148° F.) to dehydrate the binder and convert it into a substantially anhydrous viscous, adhesive fluid, in which condition it firmly cements the adjacent surfaces of the mica flakes in the formed mica product, so that when cooled a stiff integrated article is produced. Organic adhesives are obviously carbonized or destroyed, and cease to function as binders at the preferred baking temperature.

We may also use a laminated mica plate prepared with inorganic binder and pressed at about 175° C.–180° C. (about 350° F.), as described in the Willis A. Boughton U. S. Patent No. 1,975,078 dated October 2, 1934, for the preparation of mica products with inorganic binder. In such a case, the plate in tough resilient sheet form is warmed, if necessary, to approximately the temperature of prior heating when the binder softens and the plate becomes flexible. It is then shaped to the desired form and the contacted convolutions are cemented together as described above.

Tubes and other products manufactured as herein described are easily slipped from the core after removing the metal covering, because the paper has been reduced to friable carbon. The final steps, to prepare the product for use, are friction cleaning and trimming.

The nature and scope of the invention having been indicated and the preferred methods of manufacture having been specifically described, what is claimed as new, is:—

1. The method of making composite mica products which comprises enveloping a non-combustible support with a first destructible wrapper, applying to said first wrapper a mica casing formed of mica flakes and an inorganic adhesive, enveloping said mica casing with a second destructible wrapper, applying a non-combustible covering to said second destructible wrapper, securing said layers in place on said support, and baking at a temperature that will destroy said destructible wrappers, harden said adhesive and unite said mica flakes into an integrated body.

2. The method of making composite mica products which comprises enveloping a non-combustible support with a first destructible wrapper, enwrapping said first wrapper with a flexible inorganic adhesive bound pre-formed mica sheet, enveloping said mica wrapping with a second destructible wrapper, applying a non-combustible covering to said second wrapper, securing said layers in place on said support, and baking at a temperature that will destroy said destructible wrappers, and substantially dehydrate said inorganic adhesive and produce a stiff integrated mica body.

3. The method of making composite mica tubes which comprises enwrapping a non-combustible core with a first layer of paper, applying to said first paper layer a mica casing formed of mica flakes and an inorganic adhesive, enwrapping said mica casing with a second layer of paper, surrounding said layers with a pliant outer metallic covering, clamping the whole in place, and baking at a temperature that will harden said adhesive and unite said mica flakes into an integrated tube while concurrently destroying said paper wrappers and substantially separating the tube from the core and from the metallic covering permitting removal therefrom.

4. The method of making composite mica tubes which comprises enwrapping a non-combustible core with a first layer of carbonizable material, surrounding said first layer with a preformed flexible mica sheet bound with an aqueous inorganic adhesive, enwrapping said mica layer with a second layer of carbonizable material, surrounding said layers with a pliant outer metallic covering, clamping the whole in place, and baking at a temperature that will substantially dehydrate said inorganic adhesive and produce a stiff integrated tube and by carbonization of said carbonizable material will loosen the tube on the core.

5. The method of making composite mica tubes according to claim 4 in which the outer covering for the said layers consists of copper foil.

6. The method of making composite mica tubes which comprises building a preparatory structure, consisting of a sheet of flexible mica bound with an aqueous solution of an inorganic compound rolled into a cylinder, interior and exterior coverings for said cylinder formed of carbonizable material and a pliant non-combustible outer covering, upon a non-combustible core and securing said structure thereto, then concurrently converting the solution into a substantially anhydrous, viscous adhesive fluid and reducing said carbonizable material to a friable carbon by heat, and then cooling, leaving said mica cylinder as a stiff tube readily removable from between the core and the outer covering.

7. In the method of claim 6, the preliminary step of partly removing the solvent from the mica binder but not to such a degree that the sheet will not, upon warming, become sufficiently flexible for rolling into a cylinder upon the core.

8. In the method of claim 6, the use of metal foil for the non-combustible outer covering.

9. In the method of claim 6, securing the said preparatory structure to the core by clamping at its ends only.

10. The method of making composite mica tubes which comprises preparing a mold by enwrapping a metal core with paper, enwrapping said paper with a preformed flexible mica sheet bound with an aqueous inorganic adhesive and enwrapping said mica with paper thus forming three distinct layers on the rod the first and third being composed solely of paper and the second being composed solely of the mica plate, surrounding said layers with a covering of pliant metal, and securing the whole in place on the core, then baking at a temperature sufficiently high to destroy both layers of paper and to substantially dehydrate the said adhesive, and then hardening the adhesive by cooling, yielding an inflexible mica tube readily removable from the core.

11. The method of making composite mica tubes according to claim 10, in which the inorganic adhesive of the preformed flexible mica sheet is partially dehydrated prior to wrapping it around the paper that is applied to the said core.

WILLIS A. BOUGHTON.
WILLIAM R. MANSFIELD.